United States Patent
Ando (10) Patent No.: US 10,531,015 B2
(45) Date of Patent: Jan. 7, 2020

(54) IMAGING APPARATUS INCLUDING LIGHT SOURCE, REFLECTIVE ENCODING DEVICE, AND IMAGE SENSOR

(71) Applicant: Panasonic Intellectual Property Management Co., Ltd., Osaka (JP)

(72) Inventor: Takamasa Ando, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 4 days.

(21) Appl. No.: 16/054,187

(22) Filed: Aug. 3, 2018

(65) Prior Publication Data

US 2018/0367742 A1   Dec. 20, 2018

Related U.S. Application Data

(63) Continuation of application No. PCT/JP2017/009703, filed on Mar. 10, 2017.

(30) Foreign Application Priority Data

Mar. 31, 2016  (JP) .................................. 2016-071757

(51) Int. Cl.
*H04N 5/262*  (2006.01)
*H04N 5/225*  (2006.01)

(52) U.S. Cl.
CPC ......... *H04N 5/2625* (2013.01); *H04N 5/2256* (2013.01)

(58) Field of Classification Search
CPC ............. G02F 2201/44; G02F 2203/12; G02F 1/15–163; H04N 5/2625; H04N 5/2256; H04N 5/2354; G01N 21/956

(Continued)

(56) References Cited

U.S. PATENT DOCUMENTS

| 2008/0170486 A1* | 7/2008 | Sato ..................... G11B 7/0065 369/112.05 |
| 2009/0057536 A1* | 3/2009 | Hirose ..................... G01J 1/04 250/208.1 |

(Continued)

FOREIGN PATENT DOCUMENTS

| JP | 2011-513740 | 4/2011 |
| JP | 2014-531032 | 11/2014 |
| JP | 2015-041784 | 3/2015 |

OTHER PUBLICATIONS

International Search Report of PCT application No. PCT/JP2017/009703 dated May 30, 2017.

(Continued)

*Primary Examiner* — Xi Wang
(74) *Attorney, Agent, or Firm* — McDermott Will & Emery LLP (57) ABSTRACT

An imaging apparatus includes a light source that emits pulsed light, a reflective encoding device, and an image sensor. The reflective encoding device includes first and second films each having light-transmitting property and light-reflecting property and a modulator disposed between the first and second films. The modulator includes modulation regions arrayed in one plane intersecting an optical path of the pulsed light and each modulating at least one of a degree of polarization, a phase, and an intensity of incident light. The image sensor receives light from a target and outputs one or more electric signals representing an image of the target on the basis of the light from the target. The reflective encoding device allows the pulsed light to undergo multiple reflection between the first and second films and allows a portion of the pulsed light to be emitted through the second film in multiple instances.

8 Claims, 7 Drawing Sheets

(58) Field of Classification Search
USPC .............. 348/162, 308, 87, 335; 250/208.1, 250/370.08; 369/112.05
See application file for complete search history.

(56) References Cited

U.S. PATENT DOCUMENTS

2011/0007311 A1  1/2011  Correns
2014/0253713 A1  9/2014  Zhai et al.

OTHER PUBLICATIONS

Keiichi Nakagawa et al., "Sequentially timed all-optical mapping photography (STAMP)", Nature Photonics, vol. 8, Aug. 9, 10, 2014, pp. 695-700.
Liang Gao et al., "Single-shot compressed ultrafast photography at one hundred billion frames per second", Nature, 516, 7529, Dec. 4, 2014, pp. 74-77 and Supplemental Material.

* cited by examiner

IMAGING APPARATUS INCLUDING LIGHT SOURCE, REFLECTIVE ENCODING DEVICE, AND IMAGE SENSOR

BACKGROUND

1. Technical Field

The present disclosure relates to imaging apparatuses.

2. Description of the Related Art

Picosecond-order ultrafast imaging (also referred to as ultrahigh time-resolved imaging) is a technique indispensable for ultrafast dynamics or for observations of chemical reactions. With regard to ultrafast dynamics, for example, an observation of a phenomenon that occurs in a ultrashort time in femtosecond laser processing or the like makes it possible to improve the accuracy in an investigation of the physical properties of a material, in a destructive inspection, in an ablation observation, or in micromachining. With regard to a chemical reaction observation through ultrafast imaging, for example, a photochemical reaction, which is a molecular level movement, can be observed, or the behavior of a protein can be followed. The chemical reaction observation through ultrafast imaging can be applied to the field of medical treatment, drug development, healthcare, or biotechnology. Examples of techniques for achieving such ultrafast imaging are disclosed, for example, in Nakagawa, Keiichi et al., "Sequentially timed all-optical mapping photography (STAMP)," Nature Photonics, 8, 9, pp. 695-700 (2014) (hereinafter, Non-Patent Literature 1) and Gao, Liang et al., "Single-shot compressed ultrafast photography at one hundred billion frames per second," Nature, 516, 7529, pp. 74-77 (2014) (hereinafter, Non-Patent Literature 2).

SUMMARY

In one general aspect, the techniques disclosed here feature an imaging apparatus, and the imaging apparatus includes a light source that emits pulsed light, a reflective encoding device disposed in an optical path of the pulsed light, and an image sensor. The reflective encoding device includes a first film intersecting the optical path and having a light-transmitting property and a light-reflecting property, a second film intersecting the optical path and having a light-transmitting property and a light-reflecting property, and a modulator disposed between the first film and the second film. The modulator includes modulation regions that are arrayed in at least one plane intersecting the optical path and that each modulate at least one selected from the group consisting of a degree of polarization of incident light, a phase of the incident light, and an intensity of the incident light. The image sensor receives light from a target and outputs one or more electric signals representing an image of the target on the basis of the light from the target. At least one selected from the group consisting of the first film and the second film is inclined relative to a plane perpendicular to the optical path. The reflective encoding device allows the pulsed light to undergo multiple reflection between the first film and the second film and allows a portion of the pulsed light to be emitted through the second film toward the target in a plurality of instances.

General or specific embodiments of the above may be implemented by a system, a method, an integrated circuit, a computer program, or a recording medium. Alternatively, general or specific embodiments of the above may be implemented by a desired combination of a system, an apparatus, a method, an integrated circuit, a computer program, and a recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Prior to describing the embodiments of the present disclosure, underlying knowledge forming the basis of the present disclosure will be described.

Non-Patent Literature 1 discloses an example of a technique that enables ultrafast imaging as described above. According to the technique disclosed in Non-Patent Literature 1, pulsed light in a broad wavelength band is temporally stretched in respective wavelengths, and an observation target is irradiated with the resultant pulsed light. Light having image information of the observation target is spatially separated in accordance with the wavelength and is imaged by an image sensor. Thus, ultrafast imaging in a single shot is achieved.

Non-Patent Literature 2 discloses a technique in which a two-dimensional image of a target that has been subjected to intensity-modulation encoding is temporally shifted to acquire a superposed image with the use of a streak camera. A statistical operation process is carried out on the basis of the encoding information, and thus a picosecond-order ultrahigh time-resolved image is reconstructed from the acquired superposed image. The technique disclosed in Non-Patent Literature 2 can be regarded as an application example of a compressed sensing technique.

Compressed sensing is a technique for reconstructing, from acquired data with a small sample size, a greater number of pieces of data. When the two-dimensional coordinates of a measurement target are designated by (x,y) and the wavelength is designated by $\lambda$, data f to be obtained is three-dimensional data of x, y, and $\lambda$. In contrast, image data g obtained by an image sensor is two-dimensional data that is compressed and multiplexed in the λ-axis direction. The problem of obtaining the data f having a relatively large amount of data from the acquired image g having a relatively small amount of data is a so-called ill-posed problem and cannot be solved as-is. However, natural image data typically has redundancy, and using the redundancy efficiently makes it possible to transform this ill-posed problem to a well-posed problem. JPEG compression is an example of a technique for reducing the amount of data by using the redundancy of an image. In a method used in JPEG compression, image information is converted into a frequency component, and a nonessential portion of the data, such as a component with low visual recognizability, is removed. In compressed sensing, such a technique is incorporated into an operation process, and the data space to be obtained is transformed into a space expressed by the redundancy. Thus, the unknowns are reduced, and the solution is obtained. In this transformation, for example, the discrete cosine transform (DCT), the wavelet transform, the Fourier transform, the total variation (TV), or the like is used.

The present inventor has found a problem that existing ultrahigh time-resolved imaging cannot be employed when single-wavelength light is used or when a target having skewed spectral characteristics is imaged or that an expensive apparatus needs to be used in existing ultrahigh time-resolved imaging. The present inventor has come to understanding that the above-described problem can be solved by utilizing reflection and modulation of light.

The present disclose includes imaging apparatuses described in the following items.

[Item 1]

An imaging apparatus according to Item 1 of the present disclosure includes:

a light source that emits pulsed light;

a reflective encoding device disposed in an optical path of the pulsed light, the reflective encoding device including
  a first film intersecting the optical path, the first film having a light-transmitting property and a light-reflecting property,
  a second film intersecting the optical path, the second film having a light-transmitting property and a light-reflecting property, and
  a modulator disposed between the first film and the second film, the modulator including modulation regions arrayed in at least one plane intersecting the optical path, the modulation regions each modulating at least one selected from the group consisting of a degree of polarization of incident light, a phase of the incident light, and an intensity of the incident light; and an image sensor that receives light from a target and outputs one or more electric signals representing an image of the target on the basis of the light from the target. At least one selected from the group consisting of the first film and the second film is inclined relative to a plane perpendicular to the optical path. The reflective encoding device allows the pulsed light to undergo multiple reflection between the first film and the second film and allows a portion of the pulsed light to be emitted through the second film toward the target in a plurality of instances.

[Item 2]

The imaging apparatus according to Item 1 of the present disclosure may further include:

a signal processing circuit that generates pieces of data each representing an image of the target at a given time on the basis of the one or more electric signals and a spatial distribution of an intensity of the portion of the pulsed light emitted through the second film.

[Item 3]

In the imaging apparatus according to Item 2 of the present disclosure, the signal processing circuit may generate the pieces of data through a statistical method.

[Item 4]

In the imaging apparatus according to Item 2 or 3 of the present disclosure, the number of the pieces of data may be greater than the number of the one or more electric signals.

[Item 5]

In the imaging apparatus according to any one of Items 2 to 4 of the present disclosure, the signal processing circuit may generate, as the pieces of data, a vector f' calculated through the following expression by using a vector g having values of the one or more electric signals as elements and a matrix H determined by the spatial distribution of the intensity of the portion of the pulsed light emitted through the second film at respective times, $$f' = \arg\min_{f}\{\|g - Hf\|_{l_2} + \tau\Phi(f)\}$$

where τΦ(f) represents a regularization term, and τ represents a weighting factor.

[Item 6]

In the imaging apparatus according to any one of Items 1 to 5 of the present disclosure, each of the first film and the second film may have a transmittance of no greater than 5% with respect to the pulsed light.

[Item 7]

In the imaging apparatus according to any one of Items 1 to 6 of the present disclosure, the modulator may have a first surface intersecting the optical path and a second surface opposite to the first surface, the first film may be in direct contact with the first surface, and the second film may be in direct contact with the second surface.

[Item 8]

The imaging apparatus according to any one of Items 1 to 7 of the present disclosure may further include:

an optical system disposed between the reflective encoding device and the target, the optical system including at least one condenser lens.

In the present disclosure, all or part of a circuit, a unit, a device, a member, or a portion, or all or part of a functional block in a block diagram may be implemented by one or more electronic circuits including a semiconductor device, a semiconductor integrated circuit (IC), or a large scale integration (LSI). An LSI or an IC may be integrated into a single chip or may be constituted by a combination of a plurality of chips. For example, a functional block other than a memory device may be integrated into a single chip. The term LSI or IC is used herein, but the term may vary depending on the degree of integration, and the term system LSI, very large scale integration (VLSI), or ultra large scale integration (ULSI) may also be used. A field programmable gate array (FPGA) that can be programmed after manufacturing an LSI or a reconfigurable logic device that allows reconfiguration of the connection inside the LSI or setup of circuit cells inside the LSI can also be used for the same purpose.

Furthermore, it is also possible that all or part of the function or the operation of a circuit, a unit, a device, a member, or a portion is implemented through software processing. In such a case, software is recorded on one or more non-transitory recording media, such as a ROM, an optical disk, or a hard disk drive. When the software is executed by a processor, the function specified in the software is executed by the processor and peripheral devices. A system or an apparatus may include one or more non-transitory recording media on which the software is recorded, a processor, and necessary hardware devices, such as an interface.

Hereinafter, embodiments of the present disclosure will be described with reference to the drawings. It is to be noted that the embodiments described hereinafter merely illustrate general or specific examples. The numerical values, the shapes, the materials, the constituent elements, the arrangement and the connection modes of the constituent elements, the steps, the order of the steps, and so on indicated in the following embodiments are examples and are not intended to limit the present disclosure. Various aspects described in the present specification can be combined with each other unless any inconsistency arises. In addition, among the constituent elements described in the following embodiments, any constituent element that is not described in an independent claim indicating the broadest concept is described as an optional constituent element.

In the present specification, a signal representing an image (e.g., a set of signals representing pixel values of respective pixels) may be referred to as "an image signal," "image information," or "image data" in some cases. A signal representing an image may also be referred to simply as "an image" in some cases.

First Embodiment

Figure 1:
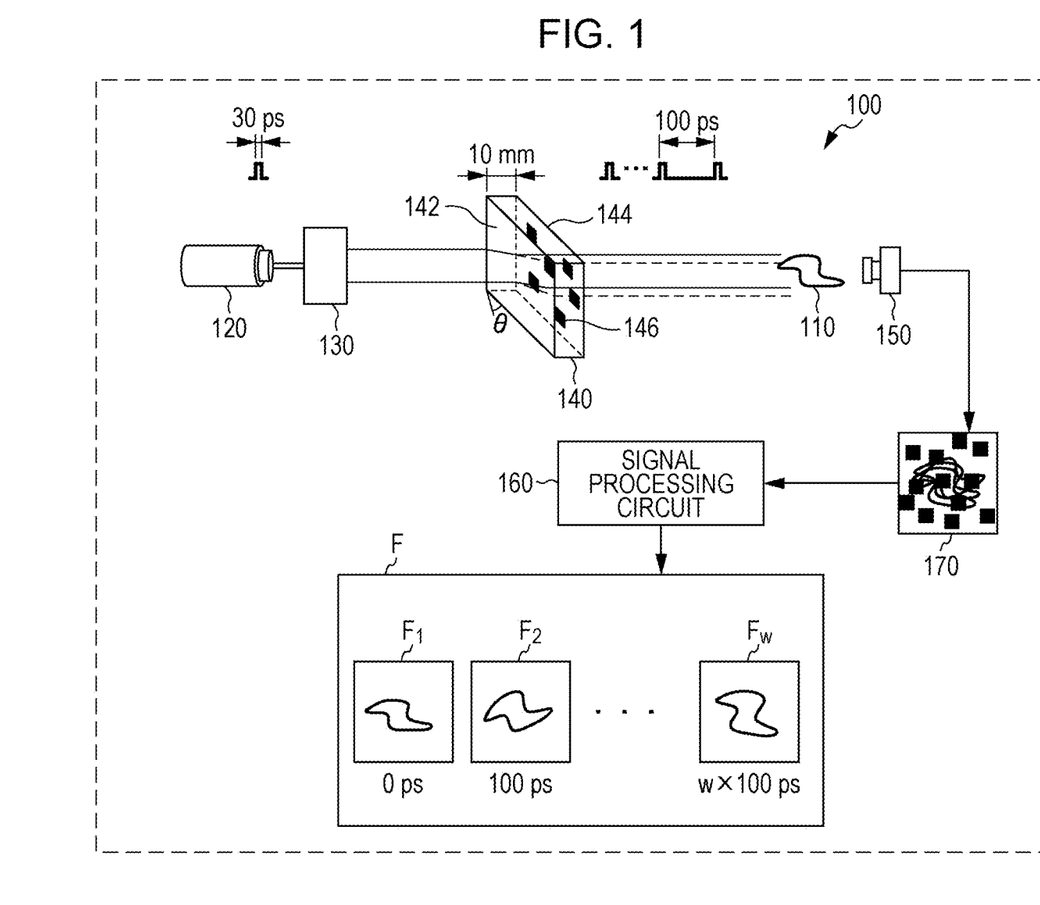
FIG. 1 is a schematic diagram illustrating an imaging apparatus according to a first embodiment of the present disclosure.

FIG. 1 schematically illustrates a configuration of an imaging apparatus 100 according to a first embodiment of the present disclosure. FIG. 1 illustrates, aside from the imaging apparatus 100, a target 110 serving as a measurement target, an example of an image to be output from the imaging apparatus 100, and an example of a plurality of images to be output from a signal processing circuit 160. The imaging apparatus 100 includes a light source 120, a beam expander 130, a reflective encoding device 140, and an image sensor 150. The reflective encoding device 140 is disposed between the light source 120 and the target 110. The beam expander 130 is disposed between the light source 120 and the reflective encoding device 140. The image sensor 150 detects light that has been emitted from the light source 120 and transmitted through the beam expander 130, the reflective encoding device 140, and the target 110, and outputs a photographed image 170, which is an electric signal representing an image of the target 110. The photographed image 170 is processed by the signal processing circuit 160. The signal processing circuit 160 generates, from the photographed image 170, time-resolved images $F_1$, $F_2$, ..., and $F_W$ (referred to collectively as "time-resolved images F" in some cases) and outputs the generated time-resolve images F.

The light source 120 emits pulsed light. The light source 120 may be implemented, for example, by a laser diode or the like that emits fast pulsed light having a pulse duration in a picosecond order or shorter. The picosecond order means a duration that is no shorter than one picosecond (ps) but shorter than one microsecond (μs). The light source 120 emits pulsed light having a pulse duration of no shorter than several picoseconds nor longer than several tens of picoseconds, for example. In one example, FIG. 1 illustrates an example in which the light source 120 emits pulsed light having a pulse duration of 30 ps.

The wavelength of light to be emitted by the light source 120 is not limited to any particular wavelength and is determined as appropriate in accordance with the target 110. The light source 120 may emit an electromagnetic wave not only in a wavelength range of visible light but also in a wavelength range of X-rays, ultraviolet, near-infrared, mid-infrared, far-infrared, or radio waves (e.g., microwaves). When the target 110 is, for example, an organism, the wavelength of light to be emitted from the light source 120 may be set, for example, to no shorter than approximately 650 nm nor longer than approximately 950 nm. Light in this wavelength range is included in a wavelength range of red to near-infrared radiation and is known to have low absorptance within a body. In the present specification, not only the visible light but also the radiation including infrared radiation and ultraviolet radiation is generally referred to as "light." The pulsed light emitted from the light source 120 is incident on the reflective encoding device 140 upon passing through the beam expander 130.

The beam expander 130 increases the spatial size of the pulsed light emitted from the light source 120. The pulsed light is expanded by the beam expander 130 to have such an irradiation area that sufficiently covers a portion of the target 110 that is to be detected. The beam expander 130 may be omitted if not necessary.

The reflective encoding device 140 is disposed in an optical path of the light from the light source 120. The reflective encoding device 140 includes a first film 142 and a second film 144 that are opposite to each other. The first film 142 and the second film 144 are each disposed to intersect the optical path of the light from the light source 120 and each have a light-transmitting property and a light-reflecting property. The second film 144 is disposed in an optical path of the light transmitted through the first film 142. The first film 142 and the second film 144 according to the present embodiment are parallel to each other. The first film 142 and the second film 144 are inclined at a angle θ relative to the direction perpendicular to the traveling direction of the incident pulsed light. The distance between the first film 142 and the second film 144 is 10 mm in the example illustrated in FIG. 1, but this is not a limiting example. The distance between the first film 142 and the second film 144 may be, for example, no less than 1 mm nor more than 100 mm. The distance between the first film 142 and the second film 144 is set to an appropriate value in accordance with the angle θ. The first film 142 and the second film 144 need not be strictly parallel to each other and may be inclined relative to each other within a range that allows for the encoding described later. It is not necessary that both the first film 142 and the second film 144 be inclined at an angle θ relative to the direction perpendicular to the traveling direction of the incident pulsed light. It suffices that at least one of the first film 142 and the second film 144 be inclined at an angle θ relative to the direction perpendicular to the traveling direction of the incident pulsed light.

The first film 142 and the second film 144 of the reflective encoding device 140 are each a dielectric film including a plurality of layers, for example. Such a dielectric film transmits a portion of incident light and reflects another portion of the incident light. In the present embodiment, the first film 142 and the second film 144 each reflect a large portion (e.g., no less than 80% nor more than 99.9%) of the incident light and transmits the remaining portion of the incident light. The reflectance and the transmittance of each of the first film 142 and the second film 144 are not limited to the above example and are set as appropriate in accordance with the intended use. Since the first film 142 and the second film 144 each have a light-reflecting property and can thus be referred to as "a reflective element."

A plurality of absorbers 146 are disposed spatially sparsely in the reflective encoding device 140. These absorbers 146 may be disposed in a space between the first film 142 and the second film 144, on the first film 142, or on the second film 144. The plurality of absorbers 146 may be disposed two-dimensionally or three-dimensionally. The absorbers 146 absorb at least a portion of the light. In FIG. 1, the absorbers 146 are indicated by black rectangles. For simplicity, FIG. 1 illustrates only a small number of absorbers 146, but in reality, a large number of absorbers 146 may be disposed within the reflective encoding device 140.

Regions where the absorbers 146 are disposed each function as a modulation region that modulates the intensity of the light. Thus, a portion including a plurality of modulation regions where the plurality of absorbers 146 are disposed is referred to as "a modulator" in the present embodiment. In other words, the reflective encoding device 140 according to the present embodiment includes a modulator disposed between the first film 142 and the second film 144. The modulator includes a plurality of modulation regions that are arrayed in at least one plane intersecting the optical path and that each modulate the intensity of the light.

Figure 2:
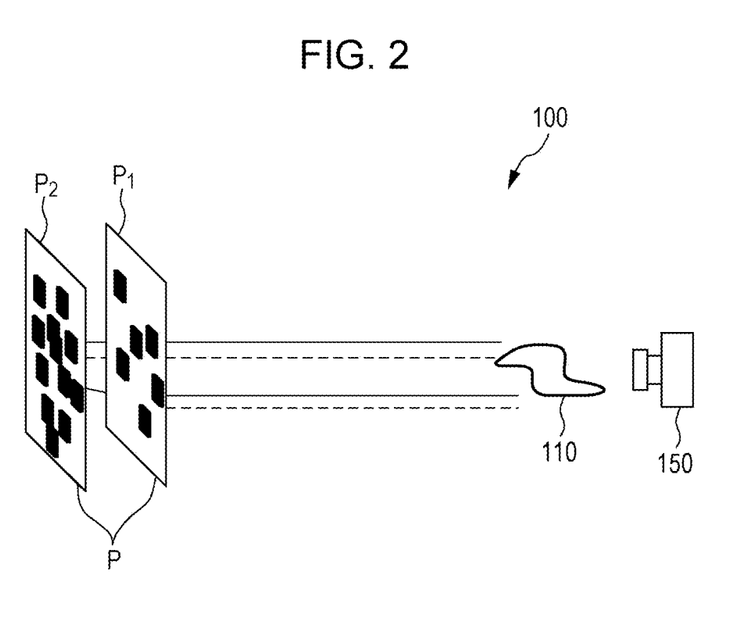
FIG. 2 is an illustration for describing an encoding illumination according to the first embodiment.

A light beam incident on the reflective encoding device 140 undergoes multiple reflection between the first film 142 and the second film 144. A portion of this light beam, while undergoing multiple reflection, is transmitted through the second film 144 in a plurality of instances and travels toward the target 110. In other words, a portion of the light incident on the reflective encoding device 140 is emitted toward the target 110 discretely in a time axis. As illustrated in FIG. 2, this process can be regarded that an encoding illumination P having a plurality of light-blocking regions, or a plurality of modulation regions, is blinking at a constant time interval while the arrangement of the light-blocking regions is being varied. FIG. 2 illustrates an encoding illumination $P_1$ and an encoding illumination $P_2$ representing two different states of the encoding illumination P.

The first film 142 and the second film 144 of the reflective encoding device 140 according to the present embodiment are inclined at an angle θ relative to a plane perpendicular to the traveling direction of the light. Therefore, an encoding pattern, or the state of the encoding illumination P, varies at each instance in which the light travels back and forth between the first film 142 and the second film 144 of the reflective encoding device 140. The encoding pattern of the encoding illumination P may be varied by changing the position of the light beam by the time when the light reflected by the second film 144 of the reflective encoding device 140 is reflected by the first film 142 and reaches the second film 144 again. In order to change the position of the light beam, the angle θ of inclination of the reflective encoding device 140 need not be set to a large value, and it is sufficient to set the angle θ to, for example, greater than 0 degrees but no greater than 10 degrees.

The difference in the emission time of the light from the encoding illuminations $P_1$, $P_2$, . . . , and $P_w$ formed discretely in the time axis is determined by the refractive index of the reflective encoding device 140 and the difference in the optical path length of the light traveling inside the reflective encoding device 140. For example, when the distance between the first film 142 and the second film 144 is 10 mm and the refractive index is 1.5, the difference between the optical path length of the light emitted from the second film 144 at a given point and the optical path length of the light emitted subsequently from the second film 144 upon multiple reflection is 30 mm. When the speed of light is $3.0 \times 10^8$ m/s, the time difference between a point when the encoding illumination P is lit and a point the encoding illumination P is lit subsequently thereafter is approximately 100 ps. This time difference can be reduced by reducing the distance between the first film 142 and the second film 144. For example, setting the distance between the first film 142 and the second film 144 to 1 mm brings the time difference to approximately 10 ps, which is extremely short.

Pulses of the light emitted from the reflective encoding device 140 at a constant time interval subject the target 101 to intensity modulation with the encoding patterns that differ at respective times. Images of the target 110 subjected to the intensity modulation in this manner are acquired by the image sensor 150. The image sensor 150 continues with the exposure while the multiple reflection is occurring in the reflective encoding device 140 (i.e., while the encoding illumination P is varying the encoding pattern). If the target 110 dynamically changes at a high speed during the exposure, an image in which an image of the target 110 that varies over time and a spatial distribution of the optical intensity, or the encoding pattern of the encoding illumination P, are superposed on each other is formed on an imaging surface of the image sensor 150. The image sensor 150 generates a photographed image 170, or an electric signal representing the stated image, and outputs the generated photographed image 170. FIG. 1 schematically illustrates an example of the photographed image 170 to be output from the image sensor 150. An optical system including at least one lens may be disposed between the image sensor 150 and the target 110, and the imaging may be carried out with the target 110 in focus.

The photographed image 170 is transmitted to the signal processing circuit 160 directly or via a recording medium (e.g., a memory) (not illustrated). Upon acquiring the photographed image 170, the signal processing circuit 160 carries out a statistical operation process on the basis of known information on the encoding illumination P. The information on the encoding illumination P is information indicating the spatial distribution of the intensity of the light emitted from the reflective encoding device 140 and applied on the target 110 in the present embodiment. With this operation, the signal processing circuit 160 reconstructs, from the photographed image 170, a plurality of time-resolved images $F_1$, $F_2$, . . . , and $F_w$. A time-resolved image Fk (k is an integer no smaller than 1 nor greater than w, and w is the time resolution number) represents an image of the k-th instance of the light passing through the second film 144 of the reflective encoding device 140 since the start of the exposure. The time difference among the time-resolved images F corresponds to the time difference among the respective encoding illuminations P. For example, as illustrated in FIG. 1, when the encoding illumination P is the pulsed light with an interval of 100 ps, the time-resolved image F is obtained at an interval of 100 ps as well.

The reflective encoding device 140, when projected onto a plane orthogonal to the path of the light and divided in a lattice pattern, includes a plurality of regions that are arrayed two-dimensionally and that have different optical transmittances. Herein, the reflective encoding device 140 includes M×N rectangular regions with M rows in the vertical direction and N columns in the horizontal direction as viewed in the direction in which the light is incident thereon. The spatial distribution of the optical transmittances of the regions in the reflective encoding device 140 may be a random distribution or a quasi-random distribution, for example.

The random distribution or the quasi-random distribution can be defined with the use of an autocorrelation function defined by the following expression (1).

$$y(i, j) = \sum_{m=1}^{M} \sum_{n=1}^{N} x(m, n) \cdot x(m+i, n+j) \quad (1)$$

In the expression (1), x(m,n) represents the optical transmittance of a rectangular region disposed at the m-th row in the vertical direction and the n-th column in the horizontal direction in the reflective encoding device 140. The variable i represents the position of each rectangular region; and i=−(M−1), ..., −1, 0, 1, ..., or (M−1), and j=−(N−1), ..., −1, 0, 1, ..., or (N−1). Herein, when m<1, n<1, m>M, and n>N, x(m,n)=0 holds. At this point, the random distribution means that the autocorrelation function y(i,j) defined by the expression (1) has a local maximum value at y(0,0) and does not have any local maximum value at other coordinates (i≠0, j≠0). To be more specific, the autocorrelation function y(i,j) monotonically decreases as i varies from 0 to (M−1) and from 0 to −(M−1) and monotonically decreases as j varies from 0 to (N−1) and from 0 to −(N−1). In addition, the quasi-random distribution means that the autocorrelation function y(i,j) has no more than M/10 local maximum values in the i-direction, aside from at y(0,0), and has no more than N/10 local maximum values in the j-direction.

The optical transmittance of each region in the reflective encoding device 140 may be in a binary-scale transmittance distribution in which the transmittance of each region (cell) may take a value of either substantially 0 or substantially 1, or may be in a gray-scale transmittance distribution in which the transmittance may take a desired value that is no smaller than 0 nor greater than 1. A portion (e.g., one half) of the entire cells may be replaced with transparent regions. In such a configuration, the plurality of transparent regions may be disposed, for example, in a checkered pattern. In other words, in the two directions (e.g., the vertical direction and the horizontal direction) in which the plurality of regions are arrayed in the reflective encoding device 140, regions with different optical transmittances and the transparent regions may be arrayed in an alternating manner.

The reflective encoding device 140 may be constituted with the use of a dielectric film including a plurality of layers, an organic material, a diffraction grating structure, various light-blocking materials, or the like.

Figure 3A:
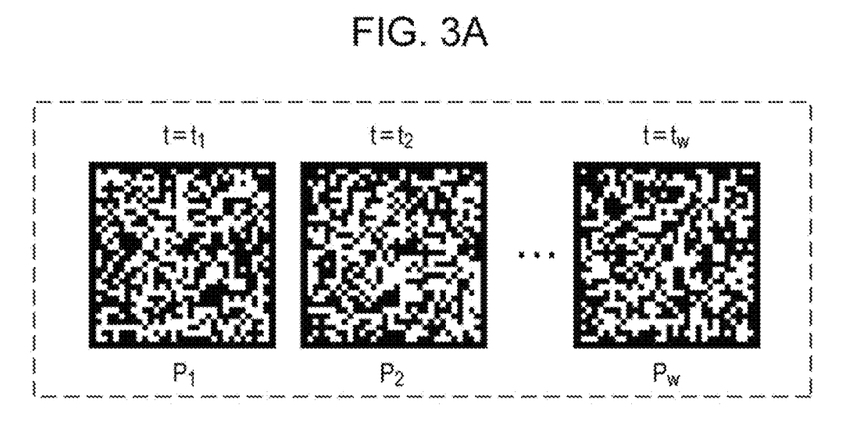
FIG. 3A illustrates an example of a two-dimensional distribution of an intensity of light emitted from an encoding illumination according to the first embodiment.

FIG. 3A illustrates an example of an intensity distribution of the encoding illumination P according to the present embodiment. In FIG. 3A, when the optical intensity is normalized to fall between 0 and 1, the optical intensity of the white portion is substantially 1, and the optical intensity of the black portion is substantially 0. The two-dimensional distribution of the optical intensity in the encoding illumination P may be, for example, a random distribution or a quasi-random distribution. The concept of the random distribution and the quasi-random distribution is as described above. The encoding illuminations $P_1, P_2, \ldots,$ and $P_w$ have respective random distributions that differ two-dimensionally.

The encoding process of the target 110 by the encoding illumination P can be regarded as a marking process for discriminating among images of the light at respective times (t=$t_1, t_2, \ldots,$ and $t_w$). As long as such marking is available, the distribution of the optical intensity may be set as desired. In the example illustrated in FIG. 3A, the ratio of the number of the black portions to the number of the white portions is 1:1, but the embodiment is not limited to such a ratio. For example, the distribution may be skewed such that the ratio of the number of the white portions to the number of the black portions is 1:9.

Figure 3B:
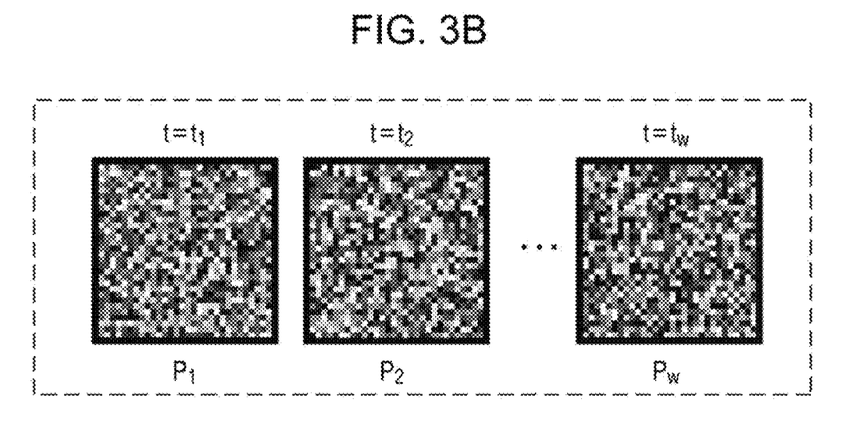
FIG. 3B illustrates another example of a two-dimensional distribution of an intensity of light emitted from an encoding illumination according to the first embodiment.

FIG. 3B illustrates another configuration example of the encoding illumination P. In this case, each region in the encoding illumination P takes a value corresponding to one of three or more levels of optical intensity.

As illustrated in FIG. 3A and FIG. 3B, the encoding illumination P has different spatial intensity distributions at respective times $t_1, t_2, \ldots,$ and $t_w$. However, the spatial intensity distributions at the respective times may coincide with one another upon being translated in the spatial direction.

Such information on the spatial intensity distribution in the encoding illumination P is acquired in advance from design data or through an actual measurement and is used in the operation process described later.

It is to be noted that the attenuation of the light by the absorbers 146 increases as the number of instances of reflection increases in the reflective encoding device 140. Therefore, in reality, of the plurality of encoding illuminations illustrated in FIG. 3A and FIG. 3B, the encoding illumination $P_1$ is the brightest, and the encoding illumination $P_w$ is the darkest.

Next, configurations of the image sensor 150 and the signal processing circuit 160 will be described.

The image sensor 150 is a monochrome image sensor having a plurality of light-detecting cells (also referred to as "pixels" in the present specification) arrayed two-dimensionally in an imaging surface. The image sensor 150 may be, for example, a charge-coupled device (CCD) sensor, a complementary metal-oxide semiconductor (CMOS) sensor, an infrared array sensor, a terahertz array sensor, or a millimeter-wave array sensor. Each light-detecting cell includes, for example, a photodiode. The image sensor 150 need not be a monochrome image sensor. For example, a color image sensor having an R/G/B-filter, an R/G/B/IR-filter, or an R/G/B/W-filter may instead be used. The image sensor 150 may have a detection sensitivity not only in a wavelength range of visible light but also in a wavelength range of X-rays, ultraviolet, near-infrared, mid-infrared, far-infrared, or microwaves/radio waves.

The signal processing circuit 160 is a circuit that processes an image signal output from the image sensor 150. The signal processing circuit 160 may be implemented, for example, by a digital signal processor (DSP), a programmable logic device (PLD) such as a field programmable gate array (FPGA), or a combination of a central processing unit (CPU), a graphics processing unit (GPU), and a computer program. Such a computer program is stored, for example, in a recording medium such as a memory, and the operation process described later can be executed as the processor such as the CPU executes the program. The signal processing circuit 160 may be an element external to the imaging apparatus 100. The signal processing circuit 160 may be included in a personal computer (PC) electrically connected to the imaging apparatus 100 or in a signal processing device such as a cloud server on the internet. Such a system that includes a signal processing device and an imaging apparatus can be referred to as "a time resolution system."

Hereinafter, an operation of the imaging apparatus 100 according to the present embodiment will be described.

Figure 4:
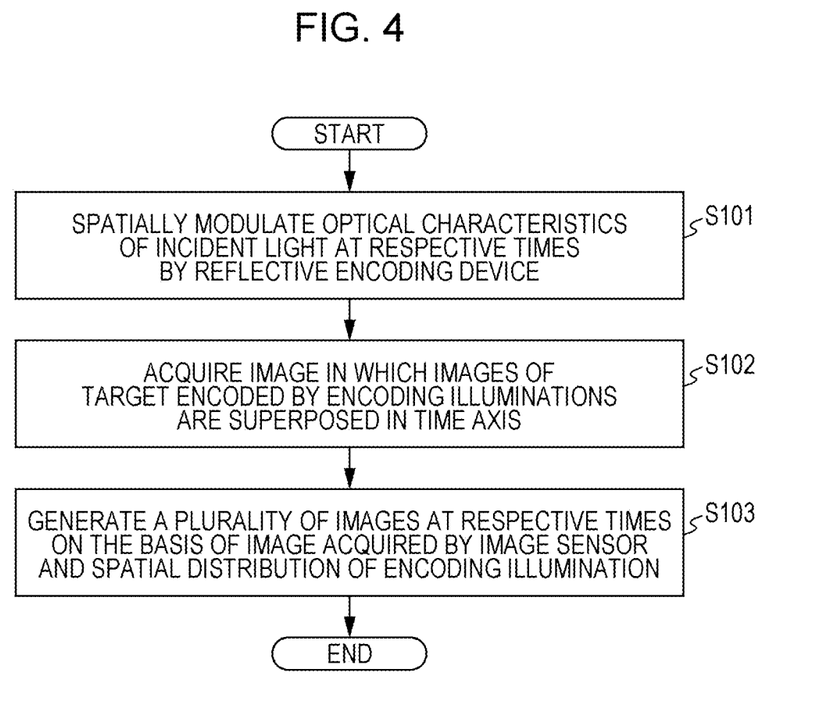
FIG. 4 is a flowchart illustrating an overview of a time-resolved imaging method according to the first embodiment.

FIG. 4 is a flowchart illustrating an overview of a time-resolved imaging method according to the present embodiment. In step S101, the optical characteristics of the incident light (e.g., the amplitude of the electric field of the light) are spatially modulated at respective times with the use of the reflective encoding device 140. This is achieved by the first film and the second film of the reflective encoding device 140 and the modulator between the first film and the second film. It is to be noted that the optical characteristics to be modulated are not limited to the amplitude, and the phase characteristics or the polarization characteristics may instead be modulated as in the embodiments described later. Next, in step S102, the image sensor 150 acquires an image in which images of the target encoded by the encoding illumination P are superposed in the time axis, or the light transmitted through the reflective encoding device 140. As described above, this is achieved as the image sensor 150 continues with the exposure while the light is undergoing multiple reflection in the reflective encoding device 140. Thereafter, in step S103, a plurality of images at respective times are generated on the basis of the photographed image 170 acquired by the image sensor 150 and the spatial distribution of the optical intensity of the encoding illumination P.

FIG. 1 schematically illustrates an example of the photographed image 170. The plurality of black dots included in the photographed image 170 illustrated in FIG. 1 schematically represent the low-luminance portions produced through the encoding. The number and the arrangement of the black dots illustrated in FIG. 1 do not reflect the actual number and arrangement. In reality, a greater number of low-luminance portions than those illustrated in FIG. 1 may be produced. The information on the multiplex images is converted into a plurality of electric signals by the plurality of light-detecting cells in the image sensor 150, and the photographed image 170 is generated.

Next, a method of reconstructing the time-resolved images F at respective times on the basis of the photographed image 170 and the spatial distribution characteristics of the intensity in the encoding illumination P at respective times will be described.

The data to be obtained is a time-resolved image F, and the data thereof is designated by f. When the time resolution number is designated by w, f is the data in which pieces of image data $f_1, f_2, \ldots,$ and $f_w$ at respective times are integrated. The number of pixels of the image data to be obtained in the x-direction is designated by n, and the number of pixels in the y-direction is designated by m. Then, each of the pieces of the image data $f_1, f_2, \ldots,$ and $f_w$ is a set of two-dimensional data with n×m pixels. Therefore, the data f is three-dimensional data having n×m×w elements. Meanwhile, the number of elements in the data g of the photographed image 170 acquired upon being encoded and multiplexed by the encoding illumination P is n×m. In other words, the number of pieces of data of the plurality of pieces of image data f of the target 110 at respective times is greater than the number of pieces of data of the photographed image 170, or the electric signal output from the image sensor 150. The data g according to the present embodiment can be expressed by the following expression (2).

$$g = Hf = H \begin{bmatrix} f_1 \\ f_2 \\ \vdots \\ f_w \end{bmatrix} \quad (2)$$

In the above, $f_1, f_2, \ldots,$ and $f_w$ are each data having n×m elements, and thus the vector on the right-hand side is in a strict sense a one-dimensional vector of n×m×w rows by one column. The vector g is transformed into and expressed as a one-dimensional vector of n×m rows by one column and is calculated. The matrix H expresses a transformation for encoding the components $f_1, f_2, \ldots,$ and $f_w$ of the vector f with the encoding information that differs at respective times and adding the results. Therefore, H is a matrix of n×m rows by n×m×w columns.

It seems that f can be calculated by solving an inverse problem of the expression (2) if the vector g and the matrix H are given. However, since the number n×m×w of the elements of the data f to be obtained is greater than the number n×m of the elements of the acquired data g, the problem results in an ill-posed problem, which cannot be solved as-is. Therefore, the signal processing circuit 160 according to the present embodiment finds a solution through a compressed sensing technique by utilizing the redundancy of the image included in the data f. Specifically, the data f to be obtained is estimated by solving the following expression (3).

$$f' = \arg\min_{f} \{\|g - Hf\|_{l_2} + \tau \Phi(f)\} \quad (3)$$

In the above, f' designates the estimated data f. The first term within the curly braces in the above expression represents the amount of deviation between the estimation result Hf and the acquired data g, or in other words, is a residual term. Although the residual term is served by a sum of squares herein, the residual term may be served by an absolute value, a square root of sum of squares, or the like. The second term within the curly braces is a regularization term (or a stabilization term), which will be described later. The expression (3) means to obtain f that minimizes the sum of the first term and the second term. The signal processing circuit 160 allows the solution to converge through a recursive iterative operation and can calculate the final solution f'.

The first term within the curly braces of the expression (3) means an operation for obtaining the sum of squares of a difference between the acquired data g and Hf obtained by subjecting f in an estimation process to a system transformation by the matrix H. The expression Φ(f) in the second term is a constraint condition in the regularization of f and is a function that reflects sparse information of the estimated data. This acts to smooth or stabilize the estimated data. The regularization term may be expressed, for example, by the discrete cosine transform (DCT) of f, the wavelet transform, the Fourier transform, the total variation (TV), or the like. For example, when the total variation is used, stable estimated data with an influence of noise of the observation data g being suppressed can be acquired. The sparseness of the target 110 in the space of each regularization term differs depending on the texture of the target 110. A regularization term that makes the texture of the target 110 become more sparse in the space of the regularization term may be selected. Alternatively, a plurality of regularization terms may be included in an operation. The expression τ is a weighting factor. As the value of τ is greater, the amount by which the redundant data can be reduced is greater, and as the value of τ is smaller, the convergence toward the solution is lowered. The weighting factor τ is set to an appropriate value such that f converges to a certain degree and does not become overcompressed.

It is to be noted that, although an operation example in which the compressed sensing illustrated in the expression (3) is used is illustrated herein, another technique may instead be employed to find a solution. For example, another statistical method, such as a maximum likelihood estimation method and a Bayes estimation method, can also be used. In addition, the number of the time-resolved images F may be set to any number, and the time interval may also be set as desired.

The present embodiment enables ultrafast imaging in a picosecond order or shorter with a relatively inexpensive configuration. The present embodiment enables imaging at a high time resolution even when light in a narrow band (e.g., single wavelength) is used or when the wavelength dependence of the transmittance or the reflectance of the target 110 is skewed.

Second Embodiment

An imaging apparatus according to a second embodiment differs from the imaging apparatus according to the first embodiment in that a modulator in a reflective encoding device 140 spatially modulates the degree of polarization of the light instead of the intensity of the light. Hereinafter, the differences from the first embodiment will be described, and detailed descriptions of similar content will be omitted.

Figure 5:
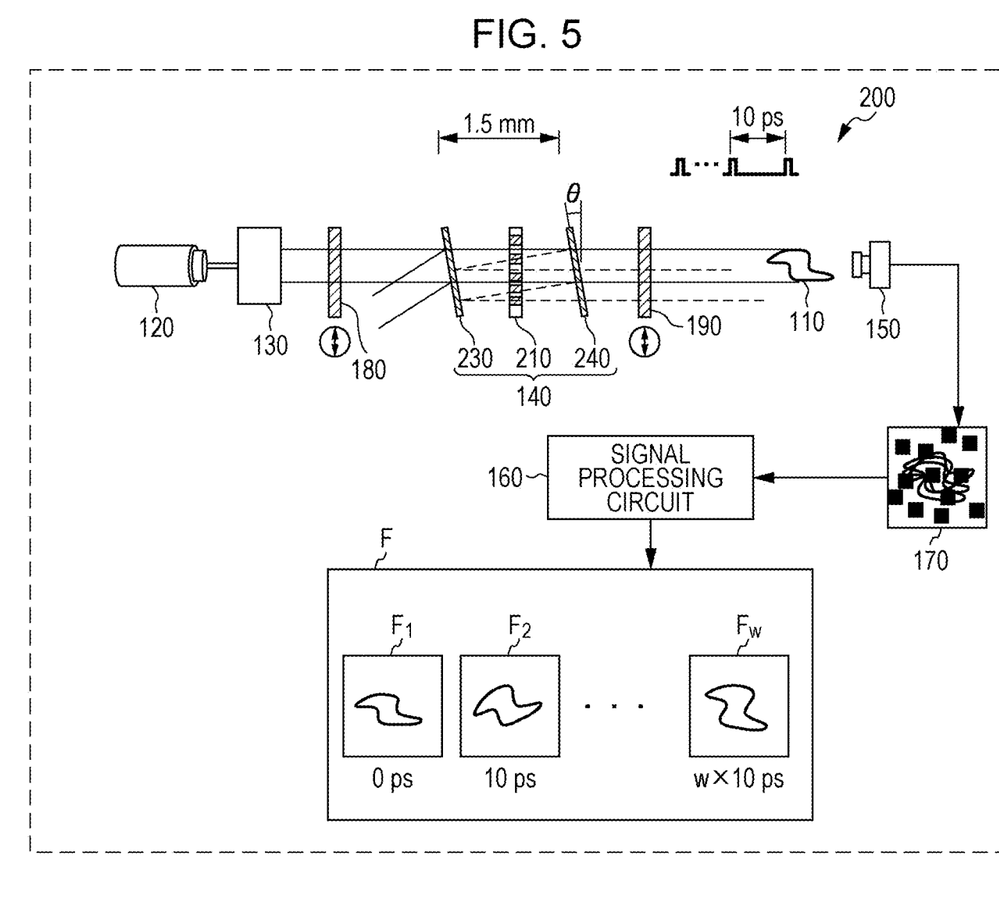
FIG. 5 is a schematic diagram illustrating an imaging apparatus according to a second embodiment of the present disclosure.

FIG. 5 schematically illustrates a configuration of an imaging apparatus 200 according to the present embodiment. The reflective encoding device 140 according to the present embodiment includes a first reflective element 230 serving as a first film, a second reflective element 240 serving as a second film, and a modulator 210 disposed between the first reflective element 230 and the second reflective element 240. At least one of the first reflective element 230 and the second reflective element 240 is disposed at an angle θ relative to a plane perpendicular to the direction in which the light from a light source 120 is incident thereon. The first reflective element 230 and the second reflective element 240, each having predetermined optical transmittance, transmit a portion of the light and reflect another portion of the light. The first reflective element 230 and the second reflective element 240 can each be formed of a dielectric film including a plurality of layers, for example. The modulator 210 modulates the degree of polarization of the light transmitted therethrough in a two-dimensionally random manner. As the first reflective element 230 is inclined at an angle θ relative to the optical axis, the position in the second reflective element 240 at which the light beam is transmitted therethrough varies at each instance of multiple reflection. Therefore, the two-dimensional polarization distribution varies. Accordingly, the reflective encoding device 140 emits light beams that spatially differ in the polarization direction toward a target 110 at a constant time interval.

The imaging apparatus 200 according to the present embodiment includes a polarizer 180, or a linear polarizer, disposed between the light source 120 and the first reflective element 230 and an analyzer 190, or a linear polarizer, disposed between the second reflective element 240 and the target 110. In the example illustrated in FIG. 5, the direction of the polarization transmission axis of the polarizer 180 coincides with the direction of the polarization transmission axis of the analyzer 190. As the polarizer 180 and the analyzer 190 are provided across the reflective encoding device 140, the spatial distribution of the polarization state of the light output from the reflective encoding device 140 can be transformed into the spatial distribution of the optical intensity.

According to the present embodiment, the combination of the polarizer 180, the reflective encoding device 140, and the analyzer 190 functions as the encoding illumination P illustrated in FIG. 2. According to the present embodiment as well, the encoding illumination P has an encoding pattern representing a two-dimensional intensity distribution.

The modulator 210 according to the present embodiment includes a plurality of modulation regions that are arrayed two-dimensionally in a plane orthogonal to the optical path of the light from the light source 120 and that module the degree of polarization of the light. In each of the modulation regions, a birefringent material, such as a liquid crystal, a crystal, or a cellophane, is disposed such that the polarization direction becomes random among these regions, for example. Alternatively, a spatial light modulator (SLM) that modulates the degree of polarization may be used. An SLM can dynamically change the spatial polarization distribution, but the modulator 210 according to the present embodiment does not need to dynamically change the spatial polarization distribution and merely needs to be capable of achieving a spatially random polarization distribution.

In the configuration according to the first embodiment in which the intensity is modulated with the use of the absorbers, the shield factor increases in accordance with the number of instances of reflection in the multiple reflection. In contrast, with the configuration according to the present embodiment, the shield factor stays constant even when the number of instances of reflection increases. Therefore, the present embodiment makes it possible to achieve a greater number of states of the encoding illumination P than those in the first embodiment and to increase the time resolution number in high time-resolved imaging. According to the present embodiment, for example, as illustrated in FIG. 5, setting the distance between the first reflective element 230 and the second reflective element 240 to 1.5 mm makes it possible to acquire an image at approximately every 10 ps.

The optical transmittance of the first reflective element 230 and the second reflective element 240 according to the present embodiment may be set to a relatively small value. The optical transmittance of the first reflective element 230 and the second reflective element 240 may be, for example, no greater than 5%, no greater than 1%, or no greater than 0.1%. In one example, when the optical transmittance is 1% and the optical reflectance is 99%, the optical intensities of an encoding illumination $P_1$ to an encoding illumination $P_{10}$ are as summarized in Table 1.

| Encoding Illumination | Intensity | Intensity Ratio |
|---|---|---|
| $P_1$ | 0.0100% | 1 |
| $P_2$ | 0.0098% | 0.98 |
| $P_3$ | 0.0096% | 0.96 |
| $P_4$ | 0.0094% | 0.94 |
| $P_5$ | 0.0092% | 0.92 |
| $P_6$ | 0.0090% | 0.90 |
| $P_7$ | 0.0089% | 0.89 |
| $P_8$ | 0.0087% | 0.87 |
| $P_9$ | 0.0085% | 0.85 |
| $P_{10}$ | 0.0083% | 0.83 |

In this case, the difference between the optical intensity of the encoding illumination $P_1$ and the optical intensity of the encoding illumination $P_{10}$ can be kept to somewhat lower than 20%, and the difference among the optical intensities of the encoding illuminations P can be reduced. When the optical transmittance of the first reflective element 230 and the second reflective element 240 is reduced, the absolute quantity of light decreases overall. However, setting the intensity of the light source 120 high makes it possible to ensure a sufficient optical intensity for the intensity modulation of the target 110. When the reflectance of the first reflective element 230 and the second reflective element 240 is increased, a large amount of stray light, or unwanted reflected light, is produced. Therefore, a measure against the stray light may be taken. For example, a light absorbing member may be disposed in the direction in which the light reflected by the first reflective element 230 travels toward the light source 120.

Figure 7:
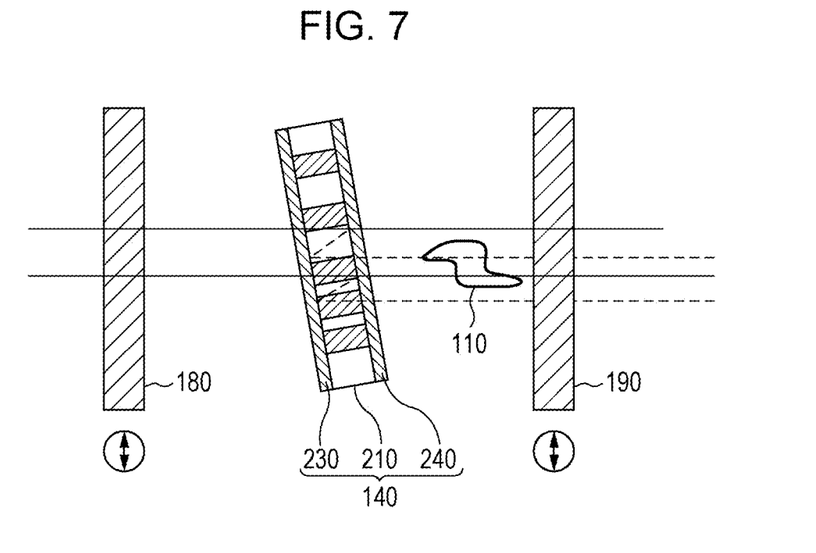
FIG. 7 illustrates a reflective encoding device according to a fourth embodiment of the present disclosure.

The first reflective element 230 and the second reflective element 240 may be in tight contact with the modulator 210, as in a fourth embodiment described later (FIG. 7). Disposing the first reflective element 230 and the second reflective element 240 in tight contact with the modulator 210 makes it possible to reduce the difference in the optical path length between the first film and the second film. Consequently, the pulse interval of the encoding illuminations P can be reduced, and fast imaging in a shorter time can be carried out.

When a laser light source that emits linearly polarized light is used as the light source 120, the polarizer 180 may be omitted. Even in such a case, however, the analyzer 190 is disposed.

Third Embodiment

A third embodiment differs from the first and second embodiments in that a modulation pattern of an encoding illumination P is reduced with the use of an optical system. Hereinafter, the differences from the first and second embodiments will be described, and detailed descriptions of similar content will be omitted.

Figure 6:
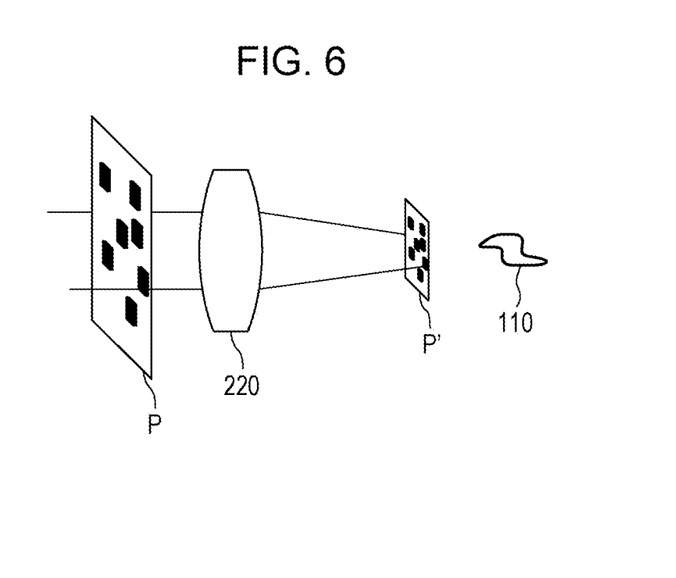
FIG. 6 illustrates an optical system according to a third embodiment of the present disclosure.

FIG. 6 schematically illustrates an optical system 220 according to the third embodiment. An imaging apparatus according to the present embodiment includes the optical system 220 that includes at least one condenser lens, and the optical system 220 is disposed between a reflective encoding device 140 and a target 110. The optical system 220 is a condenser optical system and causes the incident light to converge at a relatively high magnification. The encoding illumination P according to the present embodiment may have a configuration of that of either the first embodiment or the second embodiment.

The optical system 220 causes the light emitted from the reflective encoding device 140 to converge to thus reduce the spatial size of the encoding illumination P. As a result, as illustrated in FIG. 6, an effect equivalent to that obtained when the target 110 is irradiated with a reduced encoding illumination P' is obtained. Disposing the optical system 220 makes it possible to increase the spatial resolution of the modulation pattern of the encoding illumination P. Consequently, a small target 110, such as a cell or a molecule, can be observed, for example.

Disposing the optical system 220 makes it possible to reduce a load in micromachining when the reflective encoding device 140 is fabricated. For example, even when the distance between the centers of adjacent modulation regions, or the resolution of the encoding distribution of the reflective encoding device 140, is no less than 1 μm nor more than 10 μm, by setting the magnification of the optical system 220, for example, to no less than 2 times nor more than 20 times, the encoding illumination P of a submicron (less than 1 μm) resolution can be achieved. Furthermore, if a short-wavelength electromagnetic wave, such as ultraviolet radiation or an X-ray, is used, the spatial resolution can be further improved.

Fourth Embodiment

A fourth embodiment differs from the second embodiment in that a modulator 210 is a phase modulator. Hereinafter, the differences from the second embodiment will be described, and detailed descriptions of similar content will be omitted.

FIG. 7 schematically illustrates a configuration of the modulator 210, a polarizer 180, and an analyzer 190 according to the present embodiment. FIG. 7 omits illustrations of constituent elements such as a light source 120 and an image sensor 150. The modulator 210 according to the present embodiment includes a plurality of modulation regions that are arrayed in one plane intersecting the optical path of the light from the light source 120 and that modulate the phase of the light. The plurality of modulation regions modulate the light transmitted therethrough such that the phase of the light emitted from a second reflective element 240 differs in a two-dimensionally random manner. In FIG. 7, black portions and white portions in the modulator 210 indicate portions with different refractive indices or portions with different phase shift amounts. For example, the phase of the light transmitted through a black region once and the phase of the light transmitted through a white region once differ by 180 degrees. Such a configuration makes it possible to generate encoding illuminations P of which the spatial distribution of the phase of the emission light differs along a time axis. The phase of the emission light is further modulated by the phase of a target 110. The present embodiment makes it possible to achieve a phase difference microscope capable of ultrafast imaging. The image sensor 150 according to the present embodiment converts the information on the phase difference into the intensity information for each pixel through the configuration of the polarizer 180 and the analyzer 190 and outputs the result as the image information.

The phase distribution in the modulator 210 is not limited to a binary (two-type) phase distribution. The phase distribution may be a step-wise gray-scale phase distribution. The modulator 210 can be constituted easily with the use of a plurality of materials having different refractive indices, liquid crystals, birefringent materials, or a spatial light modulator (SLM).

As illustrated in FIG. 7, the first reflective element 230 and the second reflective element 240 according to the present embodiment are in tight contact with the modulator 210. In other words, the first reflective element 230, the second reflective element 240, and the modulator 210 are fabricated and disposed as a single piece of optical component. Such a configuration makes it possible to reduce the distance between the first reflective element 230 and the second reflective element 240 and to thus increase the time resolution. The first reflective element 230 and the second reflective element 240 may be spaced apart from the modulator 210.

Fifth Embodiment

A fifth embodiment differs from the first to fourth embodiments in that an image sensor 150 captures a reflection image of a target 110. Hereinafter, the differences from the first to fourth embodiments will be described, and detailed descriptions of similar content will be omitted.

Figure 8:
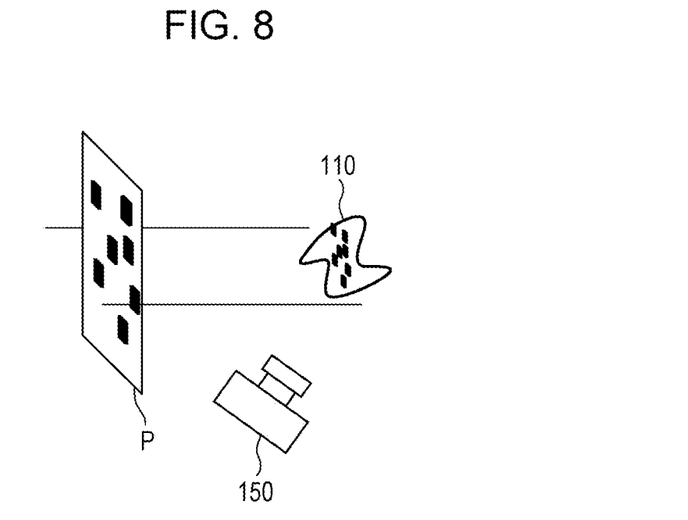
FIG. 8 illustrates an arrangement of an image sensor according to a fifth embodiment of the present disclosure.

FIG. 8 illustrates an arrangement of the image sensor 150 according to the present embodiment. A reflection image of the target 110 that has undergone optical modulation (e.g., intensity modulation, polarization modulation, or phase modulation) through the encoding illumination P is observed by the image sensor 150. In the present embodiment, a reflective encoding device 140 may have a configuration of the reflective encoding device 140 according to any one of the first to fourth embodiments.

In the present embodiment, a three-dimensional spatial distribution of the intensity of the light emitted from the encoding illumination P may be acquired in advance. This makes it possible to generate a three-dimensional image of the target 110 on the basis of the image acquired by the image sensor 150. Alternatively, a three-dimensional image of the target 110 can be reconstructed through a geometrical calculation that is based on the parallax between the encoding illumination P and the image sensor 150.

What is claimed is:

1. An imaging apparatus, comprising:
   a light source that emits pulsed light;
   a reflective encoding device disposed in an optical path of the pulsed light, the reflective encoding device including
      a first film intersecting the optical path, the first film having a light-transmitting property and a light-reflecting property,
      a second film intersecting the optical path, the second film having a light-transmitting property and a light-reflecting property, and
      a modulator disposed between the first film and the second film, the modulator including modulation regions arrayed in at least one plane intersecting the optical path, the modulation regions each modulating at least one selected from the group consisting of a degree of polarization of incident light, a phase of the incident light, and an intensity of the incident light;
   and the imaging apparatus further comprising:
   an image sensor that receives light from a target and outputs one or more electric signals representing an image of the target on the basis of the light from the target, wherein
   at least one film selected from the group consisting of the first film and the second film is inclined relative to a plane perpendicular to the optical path, and
   the reflective encoding device avows the pulsed light to undergo multiple reflection between the first film and the second film and allows a portion of the pulsed light to be emitted through the second film toward the target in a plurality of instances.

2. The imaging apparatus according to claim 1, further comprising:
   a signal processing circuit that generates pieces of data each representing an image of the target at a given time on the basis of the one or more electric signals and a spatial distribution of an intensity of the portion of the pulsed light emitted through the second film.

3. The imaging apparatus according to claim 2, wherein the signal processing circuit generates the pieces of data through a statistical method.

4. The imaging apparatus according to claim 2, wherein the number of the pieces of data is greater than the number of the one or more electric signals.

5. The imaging apparatus according to claim 2, wherein the signal processing circuit generates, as the pieces of data, a vector f calculated through the following expression by using a vector g having values of the one or more electric signals as elements and a matrix H determined by the spatial distribution of the intensity of the portion of the pulsed light emitted through the second film at respective times, $$f' = \arg\min_{f}\{\|g - Hf\|_{l_2} + \tau\Phi(f)\}$$

where $\tau\Phi(f)$ represents a regularization term, and $\tau$ represents a weighting factor.

6. The imaging apparatus according to claim 1, wherein each of the first film and the second film has a transmittance of no greater than 5% with respect to the pulsed light.

7. The imaging apparatus according to claim 1, wherein the modulator has a first surface intersecting the optical path and a second surface opposite to the first surface, the first film is in direct contact with the first surface, and the second film is in direct contact with the second surface.

8. The imaging apparatus according to claim 1, further comprising:
   an optical system disposed between the reflective encoding device and the target, the optical system including at least one condenser lens.

* * * * *